US012623651B2

(12) United States Patent (10) Patent No.: US 12,623,651 B2
Lutz (45) Date of Patent: May 12, 2026

(54) METHOD AND CONTROL DEVICE FOR OPERATING A DRIVE TRAIN OF A MOTOR VEHICLE

(71) Applicant: ZF Friedrichshafen AG, Friedrichshafen (DE)

(72) Inventor: Franz Lutz, Geltendorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 19/047,153

(22) Filed: Feb. 6, 2025

(65) Prior Publication Data

US 2025/0256696 A1 Aug. 14, 2025

(30) Foreign Application Priority Data

Feb. 8, 2024 (DE) .......................... 102024201132.0

(51) Int. Cl.
 *B60W 10/115* (2012.01)
 *B60W 10/06* (2006.01)
 (Continued)

(52) U.S. Cl.
 CPC .......... *B60W 10/115* (2013.01); *B60W 10/06* (2013.01); *B60W 30/18045* (2013.01);
 (Continued)

(58) Field of Classification Search
 CPC .... B60W 10/115; B60W 10/06; B60W 30/19; B60W 10/11; B60W 30/18036;
 (Continued)

(56) References Cited

U.S. PATENT DOCUMENTS 5,407,401 A 4/1995 Bullmer et al.
9,341,200 B2 5/2016 Miyamoto et al.
 (Continued)

FOREIGN PATENT DOCUMENTS

DE 4204401 A1 8/1993
DE 102021212842 A1 5/2023
EP 2927071 B1 10/2017

OTHER PUBLICATIONS

German Search Report for Application No. 102024201132.0 Dated Aug. 22, 2024.

*Primary Examiner* — Roger L Pang
(74) *Attorney, Agent, or Firm* — Dority & Manning, P.A.

(57) ABSTRACT

A method for operating a drive train of a motor vehicle for a reversing operation for changing from a forward gear to a reverse gear or vice versa when the motor vehicle is rolling at a speed less than a limit value, and in which a first shift element of the transmission is disengaged and a second shift element of the transmission is engaged, the method including receiving a target torque profile for a transmission output shaft for the reversing operation. The method further includes determining, based on the target torque profile for the transmission output shaft, target torque profiles for the first and second shift elements and the propulsion unit. Additionally, the method includes activating the first and second shift elements and the propulsion unit based on the respective target torque profile such that an actual torque profile follows the target torque profile for the transmission output shaft.

8 Claims, 3 Drawing Sheets

(51) Int. Cl.
    *B60W 30/18*       (2012.01)
    *B60W 30/19*       (2012.01)

(52) U.S. Cl.
    CPC ..... *B60W 30/19* (2013.01); *B60W 2510/0657*
        (2013.01); *B60W 2510/1015* (2013.01); *B60W*
            *2510/102* (2013.01); *B60W 2510/104*
        (2013.01); *B60W 2510/1045* (2013.01); *B60W*
            *2520/10* (2013.01); *B60W 2710/0666*
            (2013.01); *B60W 2710/10* (2013.01)

(58) Field of Classification Search
    CPC ............... B60W 30/18045; B60W 2510/1015;
                                     B60W 2510/102
    USPC ..................................... 701/54; 477/110, 113
    See application file for complete search history.

(56)                   References Cited

U.S. PATENT DOCUMENTS

| | | | |
|---|---|---|---|
| 9,951,864 B2 * | 4/2018 | Tachibanada ....... | F16H 61/0204 |
| 2020/0309258 A1 * | 10/2020 | McKinzie ........... | F16H 61/0213 |
| 2024/0059273 A1 * | 2/2024 | Nishimura ............ | B60W 20/15 |

\* cited by examiner

METHOD AND CONTROL DEVICE FOR OPERATING A DRIVE TRAIN OF A MOTOR VEHICLE

CROSS-REFERENCE TO RELATED APPLICATION

The present application is related and has right of priority to German Patent Application No. 10 2024 201 132.0 filed on Feb. 8, 2024, the entirety of which is incorporated by reference for all purposes.

FIELD OF THE INVENTION

The invention relates generally to a method and to a control device or unit for operating a drive train of a motor vehicle.

BACKGROUND

A drive train of a motor vehicle includes a propulsion unit as well as a transmission connected between the propulsion unit and a drive output. The transmission converts rotational speeds and torques and, in this way, provides the available tractive force of the propulsion unit at the driven end. Transmissions of motor vehicles which are known from practical experience and provide multiple gears include multiple shift elements. The shift elements of the transmission are form-locking shift elements such as dogs, and friction-locking shift elements such as clutches or brakes. In each engaged force-locking gear of a transmission, a first defined number of shift elements of the transmission is engaged and a second defined number of shift elements of the transmission is disengaged. When implementing a gear change from an actual gear to a target gear of the transmission, at least one previously engaged shift element of the transmission is disengaged and at least another, previously disengaged shift element of the transmission is engaged.

A method and a control unit for operating a drive train of a motor vehicle are desired, specifically for carrying out a reversing operation in which a gear change from a forward gear to a reverse gear or from a reverse gear to a forward gear is to be carried out in the transmission when the motor vehicle is rolling and the rolling speed thereof is less than a limit value.

In such a reversing operation, the torque provided by the propulsion unit and supplied to the transmission at the transmission input shaft is redirected such that the transmission output shaft rotates in the opposite direction of rotation during and after the reversing operation. In the process, the rotational speed and the direction of rotation are inverted in addition to the torque.

Between the propulsion unit and the drive output, a drive train has a multitude of points of tooth engagement having different transmission ratios as well as elastic and/or damping assemblies. The points of tooth engagement having different transmission ratios include, for example, the automatic, or automated, transmission and an axle transmission and/or differential gear of the drive train. The elastic and/or damping assemblies include, for example, a cardan shaft and the like.

When the motor vehicle rolls in a defined direction and a corresponding gear is engaged in the transmission, all points of tooth engagement have contact and the elastic assemblies are preloaded. In this way, the drive torque is constantly and smoothly transmitted in the corresponding direction of travel. In a reversing operation, the direction of the force flow is inverted. Points of tooth engagement which were previously under tension disengage and preloaded elastic components are relaxed. Then, a tensile stress is built up in an opposite direction and the points of tooth engagement come to rest against opposite tooth flanks. Elastic components are tensioned in the opposite direction of rotation. In such a reversing operation, tooth flanks can come to rest against one another in an uncontrolled manner and shafts can be tensioned in a manner which is incongruous with the spring stiffness thereof. As a result, shift shocks and/or jolts develop in the drive train during a reversing operation.

DE 10 2021 212 842 A1 discloses a method for determining an operating point of a clutch device in a drive train of a motor vehicle. The operating point of the clutch device is determined, in particular in a parked state of the motor vehicle, on the basis of an operating parameter of the drive train which differs from an operating variable of an actuator of the clutch device.

EP 2 927 071 B1 discloses a method for operating a drive train of a work vehicle, wherein it is determined whether the work vehicle is in an oscillating movement. According to the invention, target torques for input shafts and output shafts are to be ascertained for such an oscillating movement.

There is a need for a method and for a control unit for operating a drive train of a motor vehicle by which shift shocks and/or jolts occurring during a reversing operation are reduced or entirely avoided.

SUMMARY OF THE INVENTION

The problem addressed by the present invention is to provide a method and a control unit for operating a transmission, which allow for a constant, smooth reversing operation. According to the invention, a target torque profile for the transmission output shaft is specified for the reversing operation. According to the specified target torque profile for the transmission output shaft, a target torque profile is ascertained for the first friction-locking shift element, which is to be disengaged for the reversing operation, a target torque profile is ascertained for the second friction-locking shift element, which is to be engaged for the reversing operation, and a target torque profile is ascertained for the propulsion unit, wherein the first friction-locking shift element, the second friction-locking shift element, and the propulsion unit are activated in accordance with the particular torque profiles thereof such that an actual torque profile for the transmission output shaft follows the target torque profile for the transmission output shaft.

According to the invention, in order to carry out a reversing operation in which a gear change from a forward gear to a reverse gear or from a reverse gear to a forward gear is carried out in the transmission when the motor vehicle is rolling, the target torque profile for the propulsion unit as well as target torque profiles for the shift elements participating in the implementation of the reversing operation, i.e., for the shift element to be disengaged for the reversing operation and for the shift element to be engaged for the reversing operation, are determined according to the specified target torque profile for the transmission output shaft. The shift elements participating in the reversing operation as well as the propulsion unit are activated according to the target torque profile for the propulsion unit as well as target torque profiles for the shift elements participating in the implementation of the reversing operation, respectively, such that the actual torque profile for the transmission output shaft follows the target torque profile for the transmission output shaft, which target torque profile is specified on the control side. As a result, shift shocks and/or jolts occurring during a reversing operation are reduced or entirely avoided.

By torque balancing, the target torque profile for the propulsion unit as well as the target torque profiles for the shift elements of the transmission participating in the reversing operation are ascertained according to the target torque profile for the transmission output shaft, which target torque profile is specified on the control side.

Preferably, a target torque profile over time for the transmission output shaft is specified for the reversing operation, the time gradient of which in a range about a zero crossing of the target torque profile is less than a limit value. A particularly advantageous reversing operation is thereby possible while reducing or entirely avoiding shift shocks and/or jolts.

Preferably, the target torque profile for the first friction-locking shift element, which is to be disengaged for the reversing operation, the target torque profile for the second friction-locking shift element, which is to be engaged for the reversing operation, and the target torque profile for the propulsion unit are ascertained for successive time phases of the reversing operation according to the specified target torque profile for the transmission output shaft. For a first phase of the reversing operation, in which exclusively the first friction-locking shift element, which is to be disengaged for the reversing operation, transmits torque, one target torque profile each is ascertained exclusively for the first friction-locking shift element and for the propulsion unit. For a second phase of the reversing operation, in which exclusively the second friction-locking shift element, which is to be engaged for the reversing operation, transmits torque, one target torque profile each is ascertained exclusively for the second friction-locking shift element and for the propulsion unit. For a third phase of the reversing operation, which lies between the first phase of the reversing operation and the second phase of the reversing operation, one target torque profile each is ascertained for the first friction-locking shift element and for the second friction-locking shift element and for the propulsion unit. A particularly advantageous reversing operation is thereby possible while reducing or entirely avoiding shift shocks and/or jolts.

Preferably, for the third phase of the reversing operation, which lies between the first phase of the reversing operation and the second phase of the reversing operation, the target torque of the first friction-locking shift element, which is valid at the end of the first phase and at the beginning of the third phase, is frozen and therefore stored, wherein, for the third phase, the frozen or stored target torque of the first friction-locking shift element is reduced to zero along a reduction characteristic curve, wherein, for the third phase, the target torque profile for the propulsion unit is determined according to the frozen or stored target torque of the first friction-locking shift element, and wherein, for the third phase, the target torque profile for the second friction-locking shift element is determined according to the frozen or stored target torque of the first friction-locking shift element and according to the reduction characteristic curve for the target torque of the first friction-locking shift element. This is also used to carry out a particularly advantageous reversing operation while reducing or entirely avoiding shift shocks and jolts in the drive train during the reversing operation.

BRIEF DESCRIPTION OF THE DRAWINGS

Preferred developments can be found in the dependent claims and in the following description. Exemplary embodiments of the invention are explained in greater detail with reference to the drawing, without being limited thereto. Therein:

DETAILED DESCRIPTION

Figure 1:
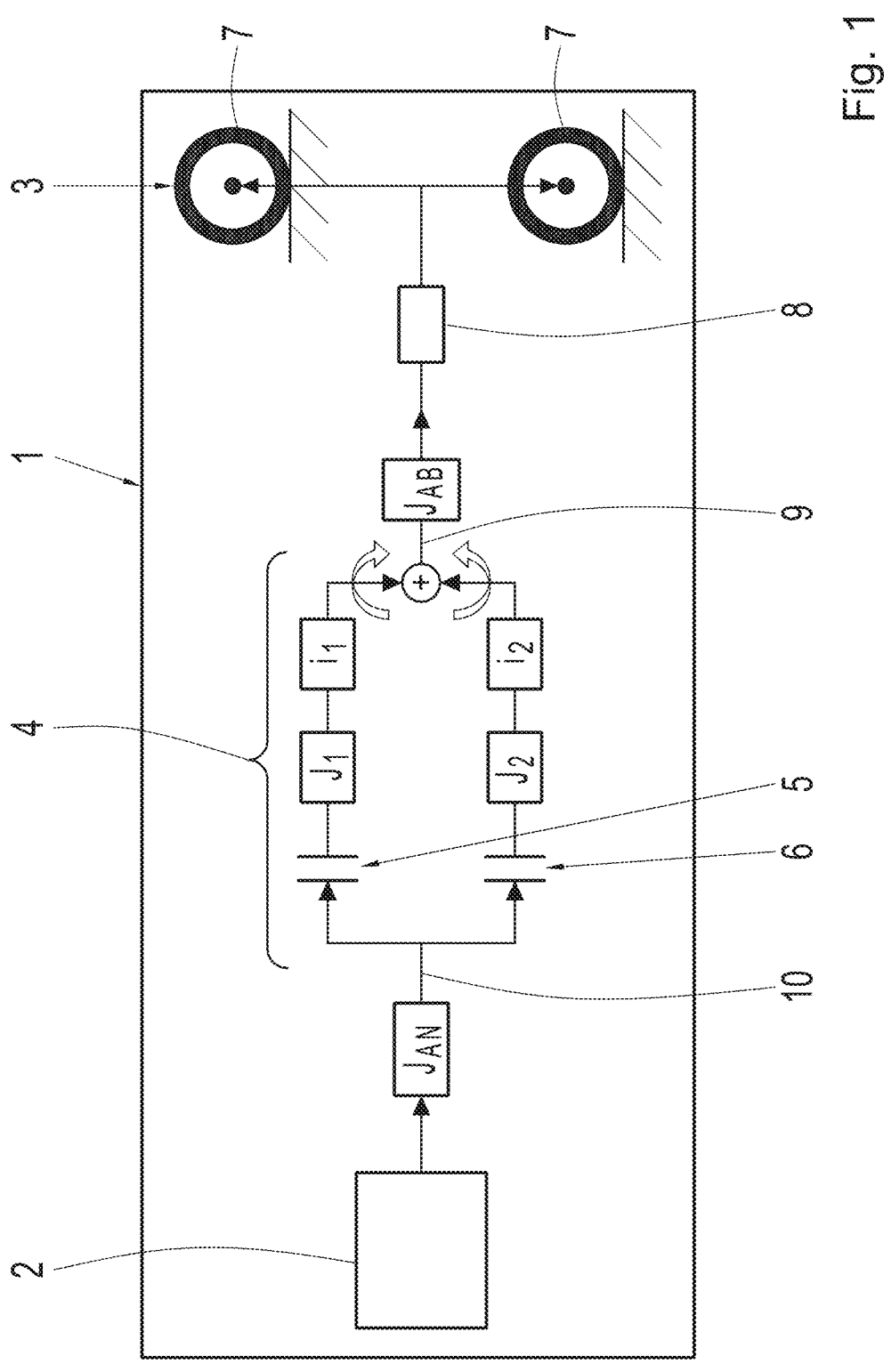
FIG. 1 shows a schematic diagram of a drive train of a motor vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 schematically shows a schematic diagram of a drive train 1 of a motor vehicle. The drive train 1 includes a propulsion unit 2 and a transmission 4 connected between the propulsion unit 2 and a drive output 3. The transmission 4 is an automatic, or automated, transmission having multiple shift elements. In FIG. 1, only two friction-locking shift elements 5, 6 are shown. The drive output 3 is shown as the driven wheels 7. An axle transmission 8 is connected between the automatic, or automated, transmission 4 and the drive output 3, as the driven wheels 7.

The invention relates to providing a reversing operation for the drive train 1, which reversing operation has reduced shift shocks, or jolts, in the drive train 1, preferably a shift shock-free and jolt-free reversing operation, i.e., when changing either from a forward gear to a reverse gear or from a reverse gear to a forward gear in the transmission 4 when the motor vehicle is rolling and the rolling speed thereof is less than a limit value.

FIG. 1 shows a first friction-locking shift element 5 of the transmission 4, which is to be disengaged for the reversing operation to be carried out. FIG. 1 also shows a second friction-locking shift element 6, which is to be engaged for the reversing operation.

In a change-over from the forward gear to the reverse gear, the first friction-locking shift element 5 is a shift element which is engaged in the forward gear and is disengaged in the reverse gear, i.e., is disengaged for the reversing operation. In this case, the second friction-locking shift element 6 is a shift element which is disengaged in the forward gear and is engaged in the reverse gear, i.e., is engaged for the reversing operation. If, in contrast, a reversing operation is to be carried out from a reverse gear to a forward gear, the first friction-locking shift element 5 is a shift element which is engaged in the reverse gear and disengaged in the forward gear, and the second friction-locking shift element is a friction-locking shift element which is disengaged in the reverse gear and engaged in the forward gear.

FIG. 1 shows effective moments of inertia J and transmission ratios i for these two friction-locking shift elements 5, 6.

The primary side of the particular shift element 5, 6 is acted on by the moment of inertia $J_{AN}$, which is dependent in particular on the moment of inertia of the propulsion unit 2. The moment of inertia $J_{AN}$ is applied at the transmission input shaft 10.

The secondary side of the first friction-locking shift element 5 is acted on by the moment of inertia $J_1$ of the assemblies of the transmission 4 that participate in the power flow and thus the torque transmission towards the transmission output shaft 9 relative to the first friction-locking shift element 5. A transmission ratio $i_1$ is effective for these assemblies. The secondary side of the second friction-locking shift element 6 is acted on by the moment of inertia $J_2$ of the assemblies of the transmission 4 that participate in the power flow and thus the torque transmission towards the transmission output shaft 9 relative to the second friction-locking shift element 6. The transmission ratio $i_2$ is effective for these assemblies.

Furthermore, the secondary sides of both friction-locking shift elements 5, 6 are acted on by the moment of inertia JAB, which is dependent in particular on the moment of inertia of the drive output 3 and on the moment of inertia of the axle transmission 8.

If a reversing operation is then to be carried out with such a drive train 1 while the motor vehicle is rolling, a target torque profile $M_{AB\text{-}SOLL}$ (FIGS. 2 and 3) for the transmission output shaft 9 is specified on the control side for the reversing operation to be carried out.

According to the target torque profile $M_{AB\text{-}SOLL}$ (FIGS. 2 and 3) for the transmission output shaft 9, which is specified on the control side, target torque profiles are ascertained for the propulsion unit 2, and thus for the transmission input shaft 10, as well as for the two friction-locking shift elements 5, 6 of the transmission 4 participating in the reversing operation. The propulsion unit 2 as well as the shift elements 5, 6 are activated in accordance with such target torque profiles and, in fact, such that an actual torque profile for the transmission output shaft 9 corresponds to, or follows, the target torque profile $M_{AB\text{-}SOLL}$ for the transmission output shaft 9.

This is carried out by a torque balancing, which is discussed in greater detail further below.

Figure 2:
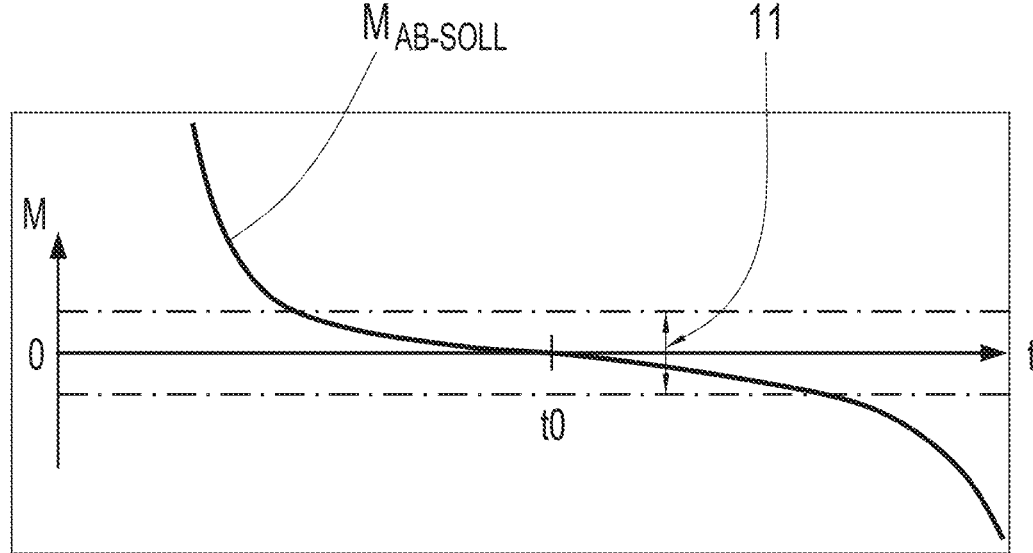
FIG. 2 shows a time-dependency diagram in accordance with aspects of the invention.

FIG. 2 shows an example of a target torque profile $M_{AB\text{-}SOLL}$ for the transmission output shaft 9, which is illustrated for a reversing operation from a forward gear to a reverse gear.

According to FIG. 2, the target torque profile $M_{AB\text{-}SOLL}$ over time for the transmission output shaft is specified such that a time gradient of this target torque profile $M_{AB\text{-}SOLL}$ in a range 11 about a zero crossing of the target torque profile $M_{AB\text{-}SOLL}$ is less than a limit value. In FIG. 2, the zero crossing of the target torque profile $M_{AB\text{-}SOLL}$ occurs at the point in time t0. The gradient $dM_{AB\text{-}SOLL}/dt$ of the target torque profile for this zero crossing and in the range 11 about the zero crossing is less than the corresponding limit value.

Preferably, the target torque profile for the two friction-locking shift elements 5, 6 participating in the reversing operation and the target torque profile for the propulsion unit 2 are ascertained for successive time phases of the reversing operation according to the specified target torque profile $M_{AB\text{-}SOLL}$ for the transmission output shaft 9.

For a first time phase of the reversing operation, in which exclusively the first friction-locking shift element 5, which is to be disengaged for the reversing operation, transmits torque, one target torque profile each is ascertained exclusively for this first friction-locking shift element 5 and for the propulsion unit 2.

For a second time phase of the reversing operation, in which exclusively the second friction-locking shift element 6, which is to be engaged for the reversing operation, transmits torque, one target torque profile each is ascertained exclusively for this second friction-locking shift element 6 and for the propulsion unit 2.

For a third time phase of the reversing operation, which lies between the first time phase and the second time phase, one target torque profile each is ascertained for both friction-locking shift elements 5, 6 and for the propulsion unit 2.

For this third phase of the reversing operation, which lies between the first phase of the reversing operation and the second phase of the reversing operation, the target torque of the first friction-locking shift element 5, which is valid at the end of the first phase and at the beginning of the third phase, is frozen or stored. For the third phase, the frozen or stored target torque of the first friction-locking shift element 5 is reduced to zero along a reduction characteristic curve, in order to thus ascertain the target torque profile for the first friction-locking shift element 5.

For the third phase, the target torque profile for the propulsion unit 2 is determined according to the frozen or stored target torque of the first friction-locking shift element 5. In the third phase, the target torque profile for the propulsion unit 2 is constant.

The target torque profile for the second friction-locking shift element 6 is determined in the third phase also according to the frozen or stored target torque of the first friction-locking shift element 5, and also according to the reduction characteristic curve with which the target torque of the first friction-locking shift element 5 is reduced from the frozen or stored target torque.

For the first time phase of the reversing operation, in which exclusively the first friction-locking shift element 5 transmits torque, the target torque profile $M_{K1sek\text{-}SOLL}$ for the first friction-locking clutch 5 and the target torque profile $M_{AN\text{-}SOLL}$ for the propulsion unit are preferably determined as follows:

$$M_{K1sek-SOLL} = \left(J_1 * \dot{\omega}_{K1sek}\right) * i_1 + \left(J_2 * \dot{\omega}_{K2sek}\right) * i_2 - M_{AB-SOLL}$$

$$M_{AN-SOLL} = \left(J_{AN} * \dot{\omega}_{AN}\right) + \left(J_1 * \dot{\omega}_{K1sek}\right) * i_1 + \left(J_2 * \dot{\omega}_{K2sek}\right) * i_2 - M_{AB-SOLL}$$

wherein $M_{K1sek\text{-}SOLL}$ is the target torque profile of the first shift element 5, $M_{AN\text{-}SOLL}$ is the target torque profile of the propulsion unit 2, $J_1$ is the moment of inertia acting on the secondary side of the first friction-locking shift element 5, $\dot{\omega}_{K1sek}$ is the secondary-side angular speed of the first shift element 5, $i_1$ is the transmission ratio which is effective for the secondary side of the first shift element 5, $J_2$ is the moment of inertia acting on the secondary side of the second friction-locking shift element 6, $\dot{\omega}_{K2sek}$ is the secondary-side angular speed of the second shift element 6, $i_2$ is the transmission ratio which is effective for the secondary side of the second shift element 6, $J_{AN}$ is the moment of inertia at the transmission input shaft 10, $\dot{\omega}_{AN}$ is the angular speed of the transmission input shaft 10, and $M_{AB\text{-}SOLL}$ is the target torque profile for the transmission output shaft 9.

For the second phase of the reversing operation, in which exclusively the second friction-locking shift element 6 participates in the torque transmission, the target torque profile $M_{K2sek-SOLL}$ for the second friction-locking clutch 6 and the target torque profile $M_{AN-SOLL}$ for the propulsion unit are preferably determined as follows:

$$M_{K2sek-SOLL} = \left(J_2 * \dot{\omega}_{K2sek}\right) * i_2 + \left(J_1 * \dot{\omega}_{K1sek}\right) * i_1 - M_{AB-SOLL}$$

$$M_{AN-SOLL} = \left(J_{AN} * \dot{\omega}_{AN}\right) + \left(J_2 * \dot{\omega}_{K2sek}\right) * i_2 + \left(J_1 * \dot{\omega}_{K1sek}\right) * i_1 - M_{AB-SOLL}$$

wherein $M_{K2sek-SOLL}$ is the target torque profile of the second shift element 6, $M_{AN-SOLL}$ is the target torque profile of the propulsion unit 2, $J_1$ is the moment of inertia acting on the secondary side of the first friction-locking shift element 5, $\dot{\omega}_{K1sek}$ is the secondary-side angular speed of the first shift element 5, $i_1$ is the transmission ratio which is effective for the secondary side of the first shift element 5, $J_2$ is the moment of inertia acting on the secondary side of the second friction-locking shift element 6, $\dot{\omega}_{K2sek}$ is the secondary-side angular speed of the second shift element 6, $i_2$ is the transmission ratio which is effective for the secondary side of the second shift element 6, $J_{AN}$ is the moment of inertia at the transmission input shaft 10, $\dot{\omega}_{AN}$ is the angular speed of the transmission input shaft 10, and $M_{AB-SOLL}$ is the target torque profile for the transmission output shaft 9.

For the third phase of the reversing operation, which lies between the first phase of the reversing operation and the second phase of the reversing operation and in which both friction-locking shift elements 5, 6 participate in the torque transmission and in which a torque transmission is to be moved from the first friction-locking shift element 5 to the second friction-locking shift element 6, the target torque of the first friction-locking shift element 5, which is to be disengaged, is first frozen or stored, which target torque is valid at the beginning of the third phase and at the end of the first phase.

Then, the target torque profile for this first friction-locking shift element 5 is ascertained according to the frozen or stored target torque and a characteristic curve. By this characteristic curve, the frozen or stored target torque for the first friction-locking shift element 5 is reduced from the frozen or stored target torque to zero, for example, along a ramp or another characteristic curve. This characteristic curve is time-normalized.

Preferably, the target torque profile $M_{K1sek-SOLL}$ for the first friction-locking shift element 5 in the third phase is determined as follows:

$$M_{K1sek-SOLL} = M_{K1sek-INI} * (1 - k(t))$$

wherein $M_{K1sek-SOLL}$ is the target torque profile of the first shift element 5, $M_{K1sek-INI}$ is the target torque of the first shift element 5, which was frozen or stored at the beginning of the third phase or at the end of the first phase, and $k(t)$ is the characteristic curve, which has been normalized over time t, for reducing the target torque of the first shift element 5 to zero.

For the third phase of the reversing operation, the target torque profile $M_{AN-SOLL}$ for the propulsion unit 2 is determined according to the frozen or stored target torque $M_{K1sek-INI}$ of the first friction-locking shift element 5 and is preferably constant.

Preferably, the target torque profile $M_{AN-SOLL}$ for the propulsion unit 2 in the third phase is determined as follows:

$$M_{AN-SOLL} = J_{AN} * \dot{\omega}_{AN} + M_{K1sek-INI}$$

wherein $M_{AN-SOLL}$ is the target torque profile of the propulsion unit 2, $M_{K1sek-INI}$ is the target torque of the first shift element 5, which was frozen or stored at the beginning of the third phase or at the end of the first phase, $J_{AN}$ is the moment of inertia at the transmission input shaft 10, and $\dot{\omega}AN$ is the angular speed of the transmission input shaft 10.

For the third phase, the target torque profile $M_{K2sek-SOLL}$ for the second friction-locking shift element 6, which is to be engaged during the reversing operation, is determined according to the frozen or stored target torque $M_{K1sek-INI}$ of the first friction-locking shift element 5 and according to the reduction characteristic curve $k(t)$ for the target torque of the first friction-locking shift element 5.

Preferably, the target torque profile $M_{K2sek-SOLL}$ for the second friction-locking shift element 6 in the third phase is determined as follows:

$$\left[M_{K1sek-INI} - J_1 * \dot{\omega}_{K1sek}\right] * i_1 * (1 - k(t)) +$$
$$\left[M_{K2sek-SOLL} - J_2 * \dot{\omega}_{K2sek}\right] * i_2 * k(t) + M_{AB-SOLL} = 0$$

wherein $M_{K1sek-INI}$ is the target torque of the first shift element 5, which was frozen or stored at the beginning of the third phase or at the end of the first phase, $J_1$ is the moment of inertia acting on the secondary side of the first friction-locking shift element 5, $\dot{\omega}_{K1sek}$ is the secondary-side angular speed of the first shift element 5, $i_1$ is the transmission ratio which is effective for the secondary side of the first shift element 5, $J_2$ is the moment of inertia acting on the secondary side of the second friction-locking shift element 6, $\dot{\omega}_{K2sek}$ is the secondary-side angular speed of the second shift element 6, $i_2$ is the transmission ratio which is effective for the secondary side of the second shift element 6, $M_{K2sek-SOLL}$ is the target torque profile of the second shift element 6, $M_{AB-SOLL}$ is the target torque profile for the transmission output shaft 9.

$k(t)$ is the characteristic curve, which has been normalized over time t, for reducing the target torque of the first shift element 5 to zero.

The aforementioned equation is to be solved for the target torque $M_{K2sek-SOLL}$ of the second friction-locking shift element 6.

Figure 3:
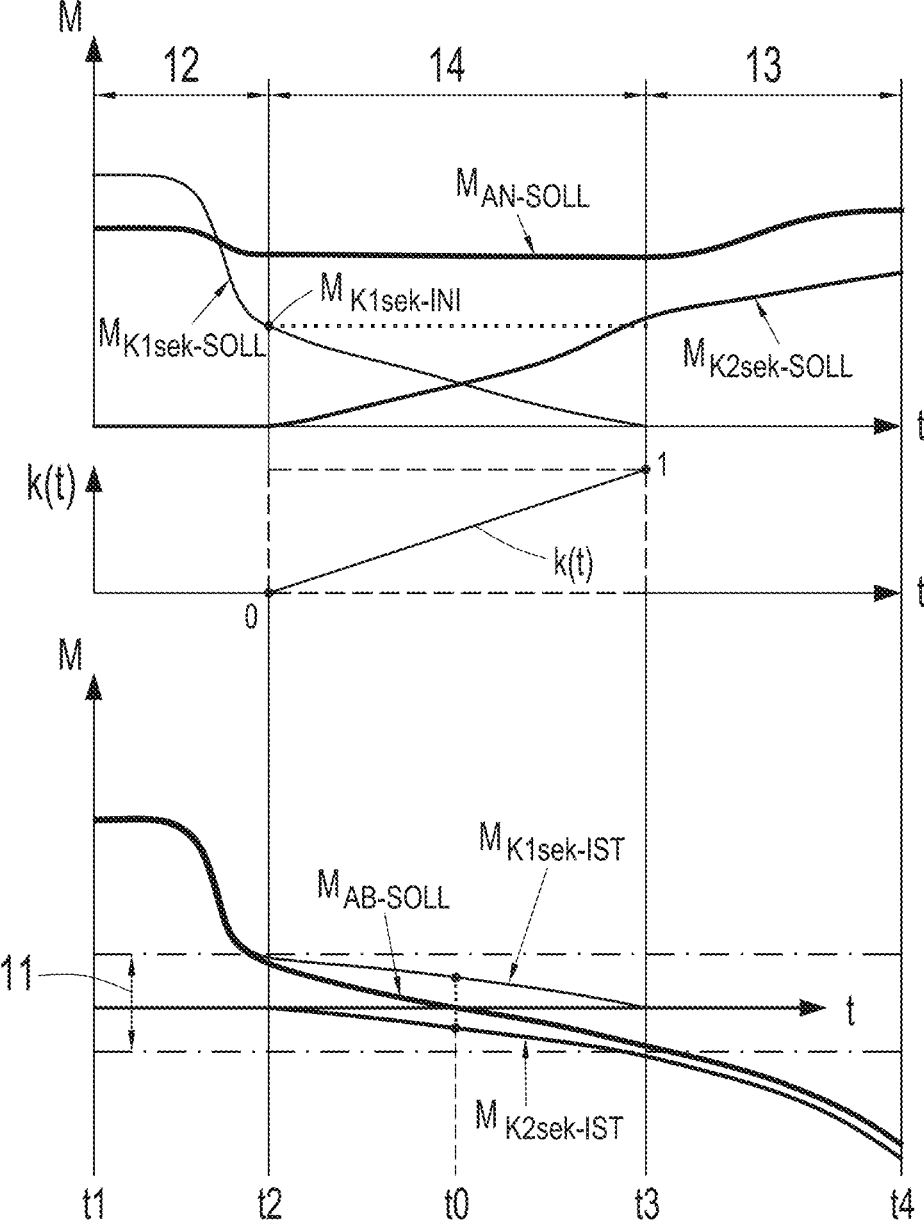
FIG. 3 shows a time-dependency diagram in accordance with aspects of the invention.

FIG. 3 shows multiple time curve profiles over time t, specifically the target torque profile $M_{AB-SOLL}$ for the transmission output shaft 9 as well as the target torque profiles $M_{K1sek-SOLL}$, $M_{K2sek-SOLL}$, which have been ascertained in accordance therewith, for the two friction-locking shift elements 5, 6 participating in the reversing operation, as well as the target torque profile $M_{AN-SOLL}$ for the propulsion unit 2. The period of time between the points in time t1, t2 corresponds to the first time phase 12 of the reversing operation, the period of time between the points in time t3, t4 corresponds to the second time phase 13 of the reversing operation, and the period of time between the points in time t2, t3 corresponds to the third phase 14 of the reversing operation.

In the first time phase 12 of the reversing operation, exclusively the target profile $M_{K1sek-SOLL}$ for the first friction-locking shift element 5, which is to be disengaged, as well as the target torque profile $M_{AN-SOLL}$ for the propulsion unit 2 are ascertained. The target torque profile $M_{K2sek-SOLL}$ for the second friction-locking shift element 6, which is to be engaged, is zero in the first phase 12.

In the second time phase 13 of the reversing operation, exclusively the target torque profile $M_{K2sek-SOLL}$ for the second friction-locking shift element 6, which is to be engaged, as well as the target torque profile $M_{AN-SOLL}$ for the propulsion unit 2 are ascertained. The target torque profile $M_{K1sek-SOLL}$ for the first friction-locking shift element 5, which is to be disengaged, is zero in the second phase 13.

In the third time phase 14 of the reversing operation, the target torque profiles $M_{K1sek-SOLL}$, $M_{K2sek-SOLL}$ for the two friction-locking shift elements 5, 6, which participate in the reversing operation, as well as the target torque profile $M_{AN-SOLL}$ for the propulsion unit 2 are ascertained. At the end of the first phase and at the beginning of the third phase, i.e., at the point in time t2, the target torque profile $M_{K1sek-SOLL}$ for the first friction-locking shift element 5, which is to be disengaged, is frozen and stored as $M_{K1sek-INI}$. Between the point in time t2 and point in time t3, i.e., in the third phase lying between the first phase and the second phase, the target torque profile $M_{K1sek-SOLL}$ for the first friction-locking shift element 5, which is to be disengaged, is reduced from the stored value $M_{K1sek-INI}$ to zero. At the point in time t2, therefore, k(t)=0 and at the point in time t3, this is k(t)=1. The characteristic curve k(t) is time-normalized. The point in time t2 corresponds to the time t=0% in the time-normalized characteristic curve. The point in time t3 corresponds to the time t=100% in the time-normalized characteristic curve. Between the points in time t2, t3, k(t) has a linear profile in FIG. 3. In some instances, the profile of k(t) between the points in time t2 and t3 is non-linear. Between points in time t2, t3, the target torque profile $M_{AN-SOLL}$ of the propulsion unit 2 is constant.

The curve profiles $M_{K1sek-IST}$, $M_{K2sek-IST}$ visualize the torques transmitted via the two shift elements 5, 6 in accordance with the aforementioned target torques.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

1 drive train
2 propulsion unit
3 drive output
4 transmission
5 shift element
6 shift element
7 wheel
8 axle transmission
9 transmission output shaft
10 transmission input shaft
11 range
12 first phase
13 second phase
14 third phase

The invention claimed is:

1. A method for operating a drive train (1) of a motor vehicle, the drive train (1) comprising a propulsion unit (2) and an automatic or automated transmission (4) connected between the propulsion unit (2) and a driven end (3), the method comprising:

for a reversing operation for changing from a forward gear to a reverse gear or from the reverse gear to the forward gear, the reversing operation being carried out when the motor vehicle is rolling at a rolling speed less than a limit value, a first friction-locking shift element (5) of the transmission (4) being disengaged during the reversing operation and a second friction-locking shift element (6) of the transmission (4) being engaged during the reversing operation, the first friction-locking shift element (5) being a first shift element which is engaged in the forward gear and the second friction-locking shift element (6) being a second shift element which is disengaged in the forward gear for changing from the forward gear to the reverse gear, or the first friction-locking shift element (5) being one shift element which is engaged in the reverse gear and the second friction-locking shift element (6) being another shift element which is disengaged in the reverse gear for changing from the reverse gear to the forward gear:

receiving a target torque profile for a transmission output shaft (9) of the transmission (4) for the reversing operation;

determining, in accordance with the target torque profile for the transmission output shaft (9), a target torque profile for the first friction-locking shift element (5), a target torque profile for the second friction-locking shift element (6), and a target torque profile for the propulsion unit (2); and activating the first friction-locking shift element (5) in accordance with the target torque profile for the first friction-locking shift element (5), the second friction-locking shift element (6) in accordance with the target torque profile for the second friction-locking shift element (6), and the propulsion unit (2) in accordance with the target torque profile for the propulsion unit (2) such that an actual torque profile for the transmission output shaft (9) follows the target torque profile for the transmission output shaft (9).

2. The method of claim 1, wherein a time gradient of the target torque profile for the transmission output shaft (9)

over time in a range defined about a zero crossing of the target torque profile is less than a limit value.

3. The method of claim 1, wherein determining the target torque profile for the first friction-locking shift element (5), the target torque profile for the second friction-locking shift element (6), and the target torque profile for the propulsion unit (2) comprises:

determining for a first phase of the reversing operation, in which exclusively the first friction-locking shift element (5) to be disengaged for the reversing operation transmits torque, one target torque profile each exclusively for the first friction-locking shift element (5) and for the propulsion unit (2);

determining for a second phase of the reversing operation, in which exclusively the second friction-locking shift element (6) to be engaged for the reversing operation transmits torque, one target torque profile each exclusively for the second friction-locking shift element (6) and for the propulsion unit (2); and determining for a third phase of the reversing operation, one target torque profile each for the first friction-locking shift element (5), the second friction-locking shift element (6), and the propulsion unit (2), wherein the first phase, the second phase, and the third phase are successive time phases, with the third phase being between the first phase and the second phase.

4. The method of claim 3, wherein, for the third phase:

a target torque value of the first friction-locking shift element (5) which is valid at an end of the first phase and at a beginning of the third phase is stored, the target torque value of the first friction-locking shift element (5) is reduced to zero along a reduction characteristic curve from the end of the first phase to the beginning of the third phase, the target torque profile for the propulsion unit (2) is determined according to the target torque value of the first friction-locking shift element (5), the target torque profile for the second friction-locking shift element (6) is determined according to the target torque value of the first friction-locking shift element (5) and the reduction characteristic curve for the target torque value of the first friction-locking shift element (5).

5. The method of claim 4, wherein determining, for the first phase, the target torque profile ($M_{K1sek-SOLL}$) for the first friction-locking shift element (5) and the target torque profile ($M_{AN-SOLL}$) for the propulsion unit (2) comprises:

determining, for the first phase, the target torque profile ($M_{K1sek-SOLL}$) for the first friction-locking shift element (5) based on a moment of inertia ($J_1$) acting on a secondary side of the first friction-locking shift element (5), a secondary-side angular speed ($\acute{\omega}_{K1sek}$) of the first shift element (5), a transmission ratio (i) effective for the secondary side of the first shift element (5), a moment of inertia ($J_2$) acting on a secondary side of the second friction-locking shift element (6), a secondary-side angular speed ($\acute{\omega}_{K2sek}$) of the second shift element (6), a transmission ratio ($i_2$) effective for the secondary side of the second shift element (6), and the target torque profile ($M_{AB-SOLL}$) for the transmission output shaft (9) using: $M_{K1sek-SOLL}=(J_1*\acute{\omega}_{K1sek})*i_1+(J_2*\acute{\omega}_{K2sek})*i_2-M_{AB-SOLL}$; and determining, for the first phase, the target torque profile ($M_{AN-SOLL}$) for the propulsion unit (2) based on a moment of inertia ($J_{AN}$) at a transmission input shaft (10), an angular speed ($\acute{\omega}_{AN}$) of the transmission input shaft (10), the moment of inertia ($J_1$) acting on the secondary side of the first friction-locking shift element (5), the secondary-side angular speed ($\acute{\omega}_{K1sek}$) of the first shift element (5), the transmission ratio ($i_1$) effective for the secondary side of the first shift element (5), the moment of inertia ($J_2$) acting on the secondary side of the second friction-locking shift element (6), the secondary-side angular speed ($\acute{\omega}_{K2sek}$) of the second shift element (6), the transmission ratio ($i_2$) effective for the secondary side of the second shift element (6), and the target torque profile ($M_{AB-SOLL}$) for the transmission output shaft (9) using: $M_{AN-SOLL}=(J_{AN}*\acute{\omega}_{AN})+(J_1*\acute{\omega}_{K1sek})*i_1+(J_2*\acute{\omega}_{K2sek})*i_2-M_{AB-SOLL}$.

6. The method of claim 4, wherein, for the second phase, determining the target torque profile ($M_{K2sek-SOLL}$) for the second friction-locking shift element (6) and the target torque profile ($M_{AN-SOLL}$) for the propulsion unit (2) comprises:

determining the target torque profile ($M_{K2sek-SOLL}$) for the second friction-locking shift element (6) based on a moment of inertia ($J_2$) acting on a secondary side of the second friction-locking shift element (6), a secondary-side angular speed ($\acute{\omega}_{K2sek}$) of the second shift element (6), a transmission ratio ($i_2$) effective for the secondary side of the second shift element (6), a moment of inertia ($J_1$) acting on a secondary side of the first friction-locking shift element (5), a secondary-side angular speed ($\acute{\omega}_{K1sek}$) of the first shift element (5), a transmission ratio ($i_1$) effective for the secondary side of the first shift element (5), and the target torque profile ($M_{AB-SOLL}$) for the transmission output shaft (9) using: $M_{K2sek-SOLL}=(J_2*\acute{\omega}_{K2sek})*i_2+(J_1*\acute{\omega}_{K1sek})*i_1-M_{AB-SOLL}$; and determining the target torque profile ($M_{AN-SOLL}$) for the propulsion unit (2) based on a moment of inertia ($J_{AN}$) at a transmission input shaft (10), an angular speed ($\acute{\omega}_{AN}$) of the transmission input shaft (10), the moment of inertia ($J_2$) acting on the secondary side of the second friction-locking shift element (6), the secondary-side angular speed ($\acute{\omega}_{K2sek}$) of the second shift element (6), the transmission ratio ($i_2$) effective for the secondary side of the second shift element (6), the moment of inertia ($J_1$) acting on the secondary side of the first friction-locking shift element (5), the secondary-side angular speed ($\acute{\omega}_{K1sek}$) of the first shift element (5), the transmission ratio ($i_1$) effective for the secondary side of the first shift element (5), and the target torque profile ($M_{AB-SOLL}$) for the transmission output shaft (9) using: $M_{AN-SOLL}=(J_{AN}*\acute{\omega}_{AN})+(J_2*\acute{\omega}_{K2sek})*i_2+(J_1*\acute{\omega}_{K1sek})*i_1-M_{AB-SOLL}$.

7. The method of claim 6, wherein, for the third phase, determining the target torque profile ($M_{K1sek-SOLL}$) for the first friction-locking shift element (5), the target torque profile ($M_{K2sek-SOLL}$) for the second friction-locking shift element (6), and the target torque profile ($M_{AN-SOLL}$) for the propulsion unit (2) comprises:

determining the target torque profile ($M_{K1sek-SOLL}$) for the first friction-locking shift element (5) based on a stored target torque ($M_{K1sek-INI}$) of the first shift element (5) and a characteristic curve ($k(t)$), normalized over time ($t$), for reducing the target torque profile of the first shift element (5) to zero using: $M_{K1sek-SOLL}=M_{K1sek-INI}*(1-k(t))$;

determining the target torque profile ($M_{AN-SOLL}$) for the propulsion unit (2) the second friction locking shift element (6) based on the moment of inertia ($J_{An}$) at the transmission input shaft (10), the angular speed ($\acute{\omega}_{AN}$) of the transmission input shaft (10), and the stored target torque ($M_{K1sek\text{-}INI}$) of the first shift element (5) using $M_{AN\text{-}SOLL} = J_{An} * \omega_{AN} + M_{K1sek\text{-}INI}$; and determining the target torque profile ($M_{K2sek\text{-}SOLL}$) for the second friction-locking shift element (6) based on the stored target torque ($M_{K1sek\text{-}INI}$) of the first shift element (5), the moment of inertia ($J_1$) acting on the secondary side of the first friction-locking shift element (5), the secondary-side angular speed ($\omega_{K1sek}$) of the first shift element (5), the transmission ratio ($i_1$) effective for the secondary side of the first shift element (5), the characteristic curve (k(t)), the moment of inertia ($J_2$) acting on the secondary side of the second friction-locking shift element (6), the secondary-side angular speed ($\omega_{K2sek}$) of the second shift element (6), the transmission ratio ($i_2$) effective for the secondary side of the second shift element (6), and the target torque profile ($M_{AB\text{-}SOLL}$) for the transmission output shaft (9) using: $[M_{K1sek\text{-}INI} - J_1 * \omega_{K1sek}] * i_1 * (1 - k(t)) + [M_{K2sek\text{-}SOLL} - J_2 * \omega_{K2sek}] * i_2 * k(t) + M_{AB\text{-}SOLL} = 0$.

8. A control unit (20) for operating a drive train (1) of a motor vehicle, the control unit (20) being configured to automatically carry out the method of claim 1 on a control side.

\* \* \* \* \*